United States Patent
Schaefer

(10) Patent No.: US 11,773,768 B2
(45) Date of Patent: Oct. 3, 2023

(54) WASTEGATE WITH REDUCED LEAKAGE CURRENT

(71) Applicant: Caterpillar Energy Solutions GmbH, Mannheim (DE)

(72) Inventor: Friedrich Schaefer, Edenkoben (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 8 days.

(21) Appl. No.: 17/615,443

(22) PCT Filed: May 28, 2020

(86) PCT No.: PCT/EP2020/025251
§ 371 (c)(1),
(2) Date: Nov. 30, 2021

(87) PCT Pub. No.: WO2020/239267
PCT Pub. Date: Dec. 3, 2020

(65) Prior Publication Data
US 2022/0228524 A1    Jul. 21, 2022

(30) Foreign Application Priority Data
May 31, 2019 (GB) .................................... 1907754

(51) Int. Cl.
*F16K 1/22* (2006.01)
*F02B 37/18* (2006.01)
(Continued)

(52) U.S. Cl.
CPC .............. *F02B 37/183* (2013.01); *F16K 1/22* (2013.01); *F16K 1/222* (2013.01); *F16K 1/226* (2013.01);
(Continued)

(58) Field of Classification Search
CPC .......... F02B 37/183; F16K 1/22; F16K 1/222; F16K 1/226; F16K 25/005;
(Continued)

(56) References Cited

U.S. PATENT DOCUMENTS 3,525,499 A * 8/1970 Geiselman .............. F16K 1/226
251/306
3,575,381 A * 4/1971 Gilmore ................ F16K 1/2263
251/359
(Continued)

FOREIGN PATENT DOCUMENTS

DE          19604009 A1    8/1996
DE      102011000101 A1    7/2012
(Continued)

OTHER PUBLICATIONS

International Search Report related to Application No. PCT/EP2020/025251; dated Sep. 4, 2020.
(Continued)

*Primary Examiner* — John Bastianelli

(57) ABSTRACT

Valves for gas engines are disclosed, in particular for wastegates arranged upstream of a turbocharger. Accordingly, a valve for a gas engine, comprises a metal housing having an opening for providing a fluid flow out of the valve, and a metal valve member configured for adjustably restricting the fluid flow through the opening, wherein the housing is made of a first material comprising a steel and wherein the valve member is made of a second material having a thermal expansion coefficient being lower than the first material. By providing the valve member and the valve housing with materials with different thermal expansion coefficients, the expansion of the valve member may be reduced during a rapid temperature increase or heating up of the valve member e.g. when the gas engine is started or accelerated.

10 Claims, 2 Drawing Sheets

(51) Int. Cl.
*F16K 1/226* (2006.01)
*F16K 25/00* (2006.01)
*F16K 27/02* (2006.01)

(52) U.S. Cl.
CPC ........ *F16K 25/005* (2013.01); *F16K 27/0218* (2013.01)

(58) Field of Classification Search
CPC .... F16K 27/0218; Y02T 10/12; F02D 9/1085; F01D 17/105; F02C 6/12; F05D 2220/40; F05D 2260/606
USPC .......................................... 251/305–308, 368
See application file for complete search history.

(56) References Cited

U.S. PATENT DOCUMENTS

| | | | | |
|---|---|---|---|---|
| 3,593,400 | A * | 7/1971 | Geiselman | B22D 19/00 |
| | | | | 164/99 |
| 3,897,524 | A * | 7/1975 | Freismuth | F02D 9/1095 |
| | | | | 261/23.2 |
| 3,986,699 | A * | 10/1976 | Wucik, Jr. | F16K 1/2285 |
| | | | | 251/210 |
| 4,870,990 | A * | 10/1989 | Bierling | F02M 11/02 |
| | | | | 137/630.2 |
| 5,427,141 | A * | 6/1995 | Ohtsubo | F02D 9/1095 |
| | | | | 137/862 |
| 5,884,898 | A * | 3/1999 | Miyairi | F01N 3/2053 |
| | | | | 251/305 |
| 7,051,997 | B2 | 5/2006 | Hannewald | |
| 7,121,088 | B2 * | 10/2006 | Lavin | F01N 1/166 |
| | | | | 60/292 |
| 7,171,804 | B2 * | 2/2007 | Terashima | F01N 13/08 |
| | | | | 60/323 |
| 7,814,748 | B2 * | 10/2010 | Nydam | F02M 26/26 |
| | | | | 60/292 |
| 8,191,861 | B2 | 6/2012 | Elsasser et al. | |
| 8,534,994 | B2 | 9/2013 | Lombard et al. | |
| 2008/0149185 | A1 | 6/2008 | Walter et al. | |
| 2011/0116910 | A1 * | 5/2011 | Lilly | F02D 9/1065 |
| | | | | 415/148 |
| 2017/0167364 | A1 * | 6/2017 | Jeanson | F02C 6/12 |
| 2017/0226937 | A1 | 8/2017 | Eifler et al. | |

FOREIGN PATENT DOCUMENTS

| | | |
|---|---|---|
| DE | 102015222843 A1 | 5/2017 |
| JP | 6226330 A | 2/1987 |
| JP | H08303260 A | 11/1996 |
| JP | 2019007604 A | 1/2019 |
| WO | 8607428 | 12/1986 |
| WO | 2007124851 A1 | 11/2007 |
| WO | 2010006145 A1 | 1/2010 |
| WO | 2010069782 A1 | 6/2010 |
| WO | WO 2010/069782 A1 * | 6/2010 |

OTHER PUBLICATIONS

Great Britain Search Report related to Application No. 1907754.4; dated Oct. 28, 2019.

* cited by examiner

WASTEGATE WITH REDUCED LEAKAGE CURRENT

This patent application is a 35 USC § 371 U.S. national stage of International Application No. PCT/EP2020/025251 filed on May 28, 2020, which claims the benefit and priority of Great Britian Application No. 1907754.4 filed on May 31, 2019, the disclosures of which are incorporated in their entirety by reference herein.

TECHNICAL FIELD

The present invention relates to a valve for a gas engine having an improved closure function as well as corresponding valve sets and a gas engine comprising such valve.

TECHNOLOGICAL BACKGROUND

In gas engines generally one or more valves are present so as to provide a controlled usage and release of e.g. exhaust gas. Such valves, also known as wastegates, may e.g. be located in a bypass on a turbine side, i.e. upstream of a turbocharger, and essentially consist of a housing, which may be mounted on a piping. To control the opening and closing of the valve, a shaft may extend through the housing, wherein a flap is mounted on the shaft to provide a rotatable adjustment of the valve. Thereby, the position of the flap in the valve controls a fluid flow through the valve.

During operation of such gas engines, temperatures rapidly increase, thereby providing exhaust gases typically having a temperature between 400° C. and 680° C. In particular, during the initial startup of the engine, the flap of the valve, which is arranged within the exhaust gas stream, may heat up quickly compared to the housing of the valve. Such different heating is caused by the arrangement of the flap within the gas stream, wherein, in a fully opened state, a highest surface to volume ratio is provided, such that the flap surface is maximally exposed to the gas stream. In contrast, the gas engine and housing generally comprise a much larger surface that is exposed on one side to the ambient temperature, and which allows heat to be dissipated more effectively. Furthermore, the flap of the valve generally comprises a relatively low mass, such that the flap is more easily heated up than the housing. As a consequence, the flap expands more compared to the housing, which may lead to mechanical blockage of the valve. Alternative dimensioning of the valve flap, e.g. by providing a flap with a smaller diameter, may avoid such blockage yet will lead to an increased leakage from the valve, which may be unfavorable during e.g. the startup of the engine and when changing loads.

Accordingly, there is a need to improve current valves for gas engines and to at least partially abrogate the above unfavorable conditions.

SUMMARY OF THE INVENTION

Starting from the prior art, it is an objective to provide a new and inventive valve for a gas engine. In particular, it may be an objective to provide a valve with a structural stability at varying temperatures so as to ensure a valve closure during varying operational conditions of a gas engine.

This objective is solved by means of a valve with the features of claim 1, valve sets with the features of claims 11 and 12, and a gas engine with the features of claim 13. Preferred embodiments are set forth in the present specification, the Figures as well as the dependent claims.

Accordingly, a valve for a gas engine is suggested, comprising a metal housing having an opening for providing a fluid flow out of the valve, and a metal valve member configured for adjustably restricting the fluid flow through the opening, wherein the housing is made of a first material comprising a steel alloy and wherein the valve member is made of a second material having a thermal expansion coefficient being lower than the first material.

Furthermore, a valve set for a gas engine is suggested, comprising at least two corresponding valves, wherein each valve comprises a gap between the respective valve member and the respective housing, when the respective valve member is in a position maximally restricting the fluid flow, wherein the valves comprise valve members having different diameters, and wherein the second material of each valve member is based on the respective valve diameter and a predefined gap size.

Furthermore, a valve set for a gas engine is suggested, comprising at least two corresponding valves, wherein each valve comprises a gap between the respective valve member and the respective housing, when the respective valve member is in a position maximally restricting the fluid flow, wherein the valves comprise valve members having the same diameter and have different gap sizes, and wherein the second material of each valve member is based on the respective gap size.

Furthermore, a gas engine comprising at least one corresponding valve is suggested.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

Figure 1:
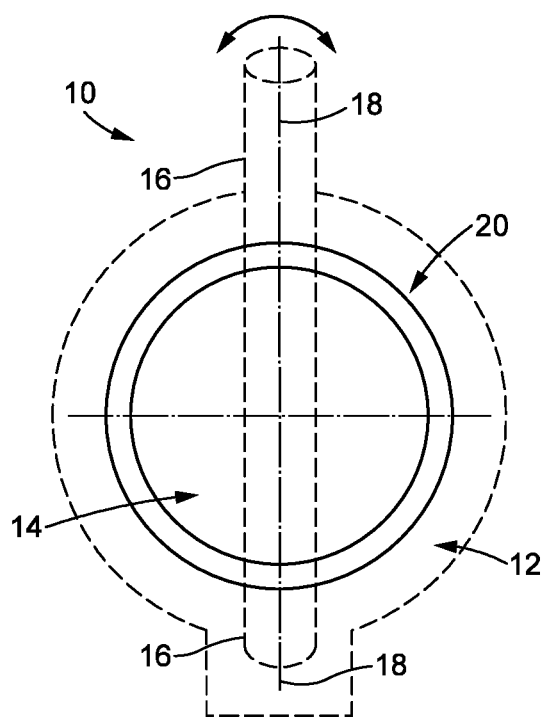
FIG. 1 schematically shows a prior art valve defining a gap between the valve member and the valve housing, wherein the gas engine is not in operation.

In the following, the invention will be explained in more detail with reference to the accompanying figures. In the Figures, like elements are denoted by identical reference numerals and repeated description thereof may be omitted in order to avoid redundancies.

In FIG. 1 a prior art embodiment of a valve 10 for a gas engine is schematically depicted. The valve 10 is shown in a closed state, such that a fluid flow or gas stream through the valve 10 is maximally restricted. The valve 10 comprises a housing 12, which is indicated by the dashed line, and may be mounted on or integrated in the gas engine. The shape of the housing 12 is only indicated as an example and is not limited to such shape. In other words, the valve 10 may comprise different shapes, e.g. ellipsoid or rectangular shapes, depending on the valve requirements and the dimensioning of the gas engine.

The housing 12 defines an opening to provide an adjustable fluid flow through the valve 10 by means of a valve member 14, which is accommodated in the opening of the housing 12. The valve member 14 is formed as a flap having an essentially circular surface or disk shape. In order to provide an adjustable flow rate, the flap 14 of the valve 10 is mounted on a shaft 16, which extends through the valve 10 along a longitudinal axis 18. Accordingly, the valve member or flap 14 is rotatably arranged in the opening or outlet of the valve housing 12.

By rotating the shaft 16 of the valve 10, as indicated by the double arrowhead, the flap 14 may hence be positioned between a closed state, as depicted in FIG. 1, and an open state, wherein the shaft 16 and flap 14 are rotated about 90°, such that a smallest surface of the flap 14 is pointing in the direction of the fluid flow, i.e. in the direction of the top view provided in FIG. 1.

To facilitate the rotation of the flap 14 within the opening of the valve housing 12, the flap 14 is dimensioned such that the edge of the outer surface of the flap 14 is spaced apart or at a distance from the inner surface of the housing 12 defining the opening. In other words, the diameter of the flap 14 is smaller than the diameter of the opening defined by the housing 12. Thereby, when the flap 14 is accommodated in the opening in the closed state of the valve 10, a gap 20 is defined between the flap 14 and the housing 12. Accordingly, even if the valve 10 is in the closed state, an amount of fluid may flow through the valve 10 via the gap 20.

To provide the required level of robustness for gas engines and a tolerance of the gas engine component to the corresponding high temperatures, e.g. ranging between 400° C., and 680° C., both the housing 12 and the flap 14 are made of a steel alloy. This may not adversely affect the structural stability of the valve 10 in situations where the flap 14 and the housing 12 have the same temperature, e.g. when the gas engine is not an operation or is in a cold state, as depicted in FIG. 1. However, due to the high surface to mass ratio and the full exposure to the fluid flow, e.g. an exhaust gas stream, the flap 14 heats up more rapidly and to a higher extent compared with the housing 12, when the gas engine is in operation, as schematically depicted in FIG. 2.

Figure 2:
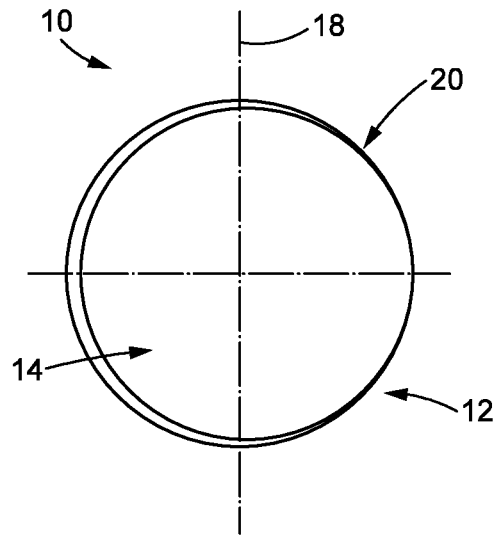
FIG. 2 schematically shows a prior art valve defining a gap between the valve member and the valve housing, wherein the gas engine is in operation.

Due to the higher temperature of the flap 14 compared with the housing 12, the surface of the flap 14 is increased by the thermal expansion, such that the gap 20 between the flap 14 and the housing 12 is significantly reduced, as indicated in FIG. 2. This gap reduction may be further increased by the formation of residual exhaust waste products on the flap 14 and/or by a reduction of residual stresses over time. Such gap reduction may result in a loss of structural stability of the valve 10 by impairing the rotation and adjustment of the flap 14 and increases the risk of a mechanical blockage of the valve 10. Accordingly, these thermal expansion factors are taken into account in the dimensioning of the diameter of the flap 14, such that the gap 20 between the flap 14 and the housing 12 is increased.

Figure 3:
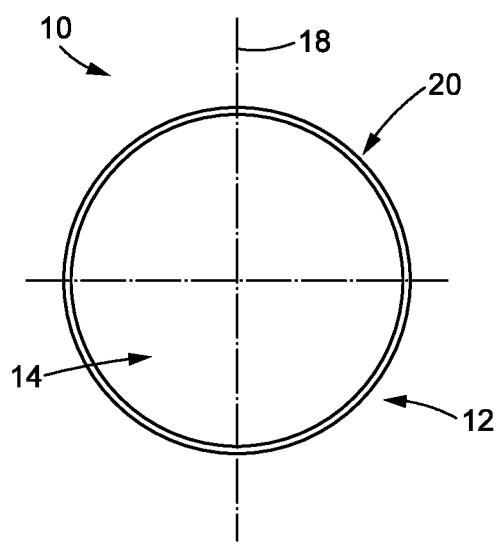
FIG. 3 schematically shows a prior art valve defining a gap between the valve member and the valve housing, wherein the gas engine is rapidly taken into operation from an off state.

Such gap 20 may require a further increase when an even larger temperature difference between the valve 14 and the housing 12 is established, which may occur, e.g. when the gas engine is started and rapidly accelerated starting from an off state, wherein the gas engine is cold. Such situation is depicted in FIG. 3, wherein the flap 14 is in contact with the inner surface of the housing 12. To anticipate such conditions, the gap 20 may be sized even larger compared with the gap size depicted in FIG. 1. However, this results in a further leakage of fluid flow from the valve 10 in the closed state of the valve 10.

Figure 4:
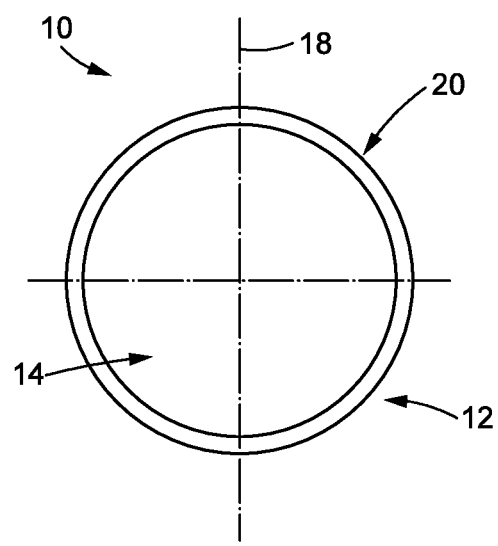
FIG. 4 schematically shows a valve according to the invention defining a gap between the valve member and the valve housing, wherein the gas engine is not in operation.

In the embodiment according to FIG. 4, such reduction of the gap size is omitted by providing a housing 12 and a flap 14 made of different materials having different thermal expansion coefficients. Accordingly, while the housing 12 may still be made of a steel alloy, the valve member or flap 14 is made of a metal having a lower thermal coefficient. Thereby, a difference in temperature between the flap 14 and the housing 12, i.e. wherein the flap 14 has a higher temperature than the housing 12, does not result in a significant reduction of the size of the gap 20 due to the lower thermal expansion coefficient of the flap 14. Hence, a smaller distance between the flap 14 and the housing 12, i.e. a smaller gap 20, may be provided, such that a leakage from the valve 10 in the closed state of the valve 10 is reduced.

Figure 5:
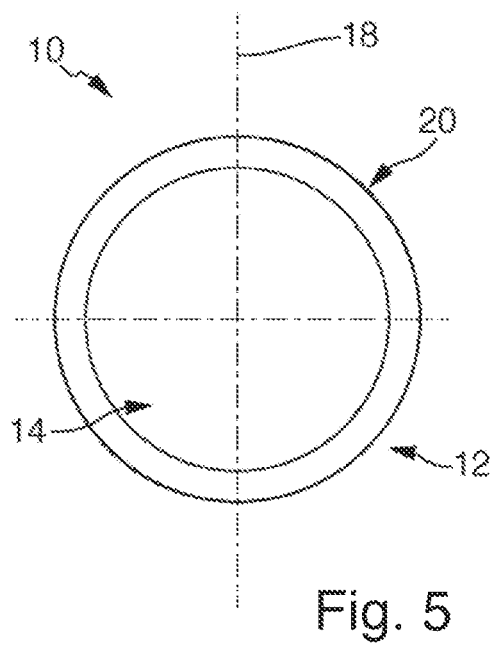
FIG. 5 schematically shows a valve according to the invention defining a gap between the valve member and the valve housing, wherein the gas engine is in operation.
Figure 6:
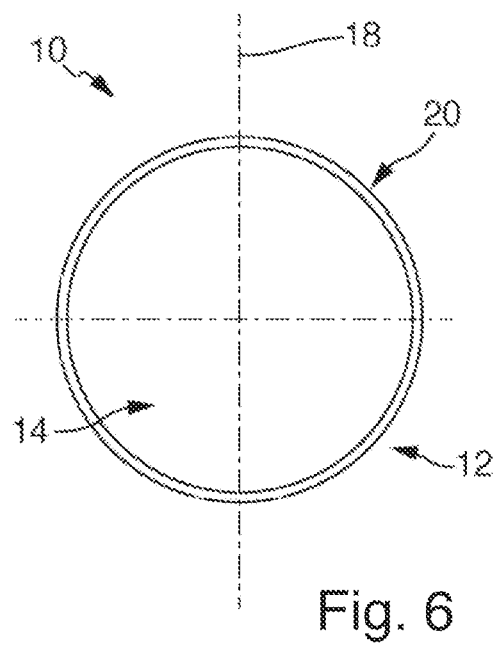
FIG. 6 schematically shows a valve according to the invention defining a gap between the valve member and the valve housing, wherein the gas engine load is rapidly increased.

The lower thermal expansion coefficient of the flap 14 hence not only enables a smaller gap size in a situation, wherein the housing 12 and the flap 14 have the same temperature, e.g., during an off state of the gas engine, as depicted in FIG. 4, but also ensures that such gap size is essentially maintained in situations, wherein the gas engine is in operation, as depicted in FIGS. 5 and 6.

Accordingly, during operation of the gas engine, as depicted in FIG. 5, the gap size is essentially maintained or may even be slightly increased due to a thermal expansion of the housing 12 while a thermal expansion of the flap 14 is not significant. Although the temperature level of the housing may still be significantly below the temperature of the flap 14, the increase of the gap 20 does not significantly increase the leakage from the valve 10 and hence does not significantly affect the performance of the gas engine.

Furthermore, the gap 20 may only be slightly reduced in the situation, wherein high temperature differences between the housing 12 and the flap 14 are present, e.g., during an initial startup, a rapid acceleration, and/or a load change or gear change of the gas engine. Although the temperature of the flap 14 may be much higher than the temperature of the housing 12, the thermal expansion of the flap 14 is only minimally increased while at the same time the temperature of the housing 12 gradually increases. As a consequence, this does not result in a significant change of the gap size.

Although the embodiments are not restricted to a particular material of the flap 14, a ratio of the thermal expansion coefficient of the flap material and the housing material preferably lies between about 0.3 and about 0.6. For example, steel alloys used in wastegates may comprise a thermal expansion coefficient in the range of about $16 \times 10^{-6}$/K, such that a flap material may be used having a thermal expansion coefficient between about $4 \times 10^{-6}$/K and about $10 \times 10^{-6}$/K, preferably between about $4.0 \times 10^{-6}$/K and about $6.0 \times 10^{-6}$/K. Materials satisfying these requirements may be provided by e.g. nickel-iron alloys, optionally comprising cobalt. Thereby, it is also ensured that the flap 14 comprises a robustness required for the gas engine.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and/or features mentioned before in any technically feasible combination.

A valve for a gas engine may be provided.

Such valve may comprise a metal housing having an opening for providing a fluid flow out of the valve, and a metal valve member configured for adjustably restricting the fluid flow through the opening, wherein the housing is made of a first material comprising a steel alloy and wherein the valve member is made of a second material having a thermal expansion coefficient being lower than the first material.

The valve member, e.g. a flap, and the valve housing are hence made of different materials, such that the coefficient of thermal expansion for the valve member is lower compared to the housing of the valve. This will lead to higher expansion of the housing and lower expansion of the flap. However, since the temperature of the housing remains lower compared to the temperature of the valve member, due to the limited exposure to e.g. a gas exhaust stream and a larger heat dissipation due to a larger surface area to the surroundings, this allows to maintain a gap as uniform as possible and as small as possible during varying operation conditions. Furthermore, this provides that also smaller valves can be used to reduce overall leakage through the valve.

Preferably, a ratio of the thermal expansion coefficient between the second material and the first material lies between about 0.3 and about 0.6. In other words, the thermal expansion coefficient of the valve member material may be in the range of e.g. one third and half of the thermal expansion coefficient of the housing material. Thereby, a low thermal expansion of the valve member is provided, even at high absolute temperatures and at high temperature differences.

While the thermal expansion coefficient of the housing, i.e. of the steel alloy may be about $16 \times 10^{-6}$/K, the thermal expansion coefficient of the second material preferably lies between about $1.0 \times 10^{-6}$/K and $11.0 \times 10^{-6}$/K, in particular, the thermal expansion coefficient of the second material may lie between about $4.0 \times 10^{-6}$/K and $6.0 \times 10^{-6}$/K. The material and the corresponding thermal expansion coefficient may hence easily be adapted to the gas engine requirements and in particular to the varying temperatures provided during the operation of the gas engine.

In order to increase the robustness of the gas engine and the corresponding component, i.e. the housing that is mounted on or integrated with the gas engine and the valve member or flap, the first material is preferably a steel alloy and the second material preferably comprises nickel. In other words, while the first material may consist of a steel alloy, the second material requires nickel to be present, e.g., in the form of an alloy.

Accordingly, the second material preferably comprises nickel and iron, wherein the percentage by weight of nickel of the second material may lie between about 25 and about 60 and the percentage by weight of iron of the second material may lie between about 40 and about 70. In addition, the second material may comprise cobalt or chrome. Such alloys have the advantage that, depending on the exact mixture of the alloy, a thermal expansion coefficient of between about $1.0 \times 10^{-6}$/K and $11.0 \times 10^{-6}$/K may be achieved for the valve member. Furthermore, the inclusion of nickel improves the abrasion resistance, which may be advantageous when the valve is in contact with high temperature exhaust gas streams.

Examples of such nickel-iron alloys and corresponding heat expansion coefficients are provided in the table below:

| $1^{st}$ component (% of weight) | $2^{nd}$ component (% of weight) | $3^{rd}$ component (% of weight) | Thermal expansion coefficient |
|---|---|---|---|
| Fe 46 | Ni 36 | | $1.2\text{-}1.8 \times 10^{-6}$/K |
| Fe 58 | Ni 42 | | $4.0\text{-}5.8 \times 10^{-6}$/K |
| Fe 53 | Ni 29 | Co 18 | $4.6\text{-}5.6 \times 10^{-6}$/K |
| Fe 52 | Ni 48 | | $8.3\text{-}8.9 \times 10^{-6}$/K |
| Ni 54 | Fe 46 | | $9.8\text{-}10.6 \times 10^{-6}$/K |
| Ni 47 | Fe 46 | Cr 6 | $10.0\text{-}10.8 \times 10^{-6}$/K |

As the temperature range for gas engines may vary depending on the operation of the gas engine, e.g., depending on whether the gas engine is started, accelerated, or a gear change or load change is performed, not only the materials used for the housing and the valve member, but also the dimensioning of the valve may be based on the particular requirements of the gas engine.

In this regard, typical exhaust gas temperatures for gas engines, e.g., upstream of a turbocharger, may lie in the range of about 500° C. to 700° C. during normal operation. For example, the exhaust gas temperature may be about 580° C., such that an average valve member temperature may lie in the range between 410° C. and 560° C., depending on the exact point of measurement, e.g., about 490° C. In contrast, depending on the position and the heat dissipation provided by, e.g., cooling or gas engine suspensions, the temperature of the housing of the valve may lie in the range between 200° C. and 500° C. Hence, in order to accommodate for such large temperature differences, the valve components may not only be comprised of different materials having different thermal expansion coefficients, but also may be sized and arranged so as to allow tolerance during e.g. peak loads.

Accordingly, the valve preferably comprises a gap between the valve member and the housing, when the valve member is in a position maximally restricting the fluid flow.

However, due to the lower thermal expansion coefficient of the valve member, such gap may be much smaller in comparison with a valve, comprising a valve member made of the same material as the valve housing. For example, a valve member may comprise a diameter of 60 mm, e.g. a radius of 30 mm. Using a standard material for the valve member and increasing the temperature from e.g. 20° C. to 600° C., the radius of the valve member may be expanded to about 30.31 mm, e.g. at a thermal expansion coefficient of $17.77 \times 10^{-6}$/K. By the same token, a housing made of a standard material may define an opening having a diameter of 60.5 mm having a tolerance of 0.1 mm, e.g. a radius of 30.2 mm, which may expand to a radius of 30.24 mm at a thermal expansion coefficient of $15.5 \times 10^{-6}$/K, when the corresponding temperature of the housing increases from 20° C. to 100° C. In such a duration, and the distance or gap between the housing and the valve member would result in a negative value of about −74 μm, such that a mechanical blockage may occur.

In order to overcome such mechanical blockage, it is required that the gap size is increased. For example, in order to provide a gap of about 55 μm during operation, the diameter of the opening defined by the housing is to be increased by 0.25 mm. However, in this case, the gap size in the cold, or turned off state of the gas engine is increased from 200 μm to 325 μm, thereby significantly increasing the leakage during startup of the engine, i.e. by more than 50 percent.

To avoid such increased leakage and ensure that the valve member may be actuated at varying temperatures during operation, the valve member may hence be formed of a material having a lower thermal expansion coefficient, e.g. $10.35 \times 10^{-6}$/K, such that under the same thermal conditions, a radius of 30.18 mm and a positive gap size of 57 μm is provided. Thereby, it is no longer required to increase the gap size, such that the valve closure during startup of the gas engine is improved while at the same time a mechanical blockage of the valve member during e.g. acceleration or a gear change of the gas engine is avoided. The use of a different material for the valve member hence helps to maintain a gap as uniform as possible and as small as possible all over the operating conditions.

By the same token, when a valve member having a diameter of 100 mm is chosen and a tolerance or gap size between the housing and the valve member under operating temperatures of between 70 and 18 μm is required, an effective gap size of about 525 μm is provided when using the same standard material, while a gap size of only 300 μm is provided when using the above material with a lower thermal expansion coefficient. In other words, by using the material with a lower thermal expansion coefficient, the leakage from the valve may be reduced by more than 40% while providing a sufficient tolerance to allow a functioning of the valve member in a situation with high temperature differences between the valve member and the valve housing.

Hence, the use of a different material for the valve member or flap enables alternative dimensioning of the valve, such that smaller and hence cheaper yet more reliable valves may be used while at the same time ensuring an optimal fluid flow restriction, which is particularly advantageous during the startup of the engine and/or gear changes of the gas engine, such that e.g. an exhaust gas flow may be efficiently directed to a turbocharger.

Accordingly, a gap distance between the valve member and the housing may be predefined by the first material and/or the second material, when the gas engine is in a start-up phase or undergoes a load change.

By the same token, the first material and/or the second material may be predefined by a gap distance between the valve member and the housing, when the gas engine is in a start-up phase or undergoes a load change.

Although a variety of valves having different shapes of valve members and valve openings defined by the housing may be provided, the valve member is preferably formed by a flap mounted on a shaft and being rotatable between a first position enabling a fluid flow through said opening and a second position being received by the opening. Such design facilitates the adjustment of the fluid flow through the valve and furthermore requires a low amount of material to effectively restrict the fluid flow through or out of the valve while providing a robust structure.

Furthermore, a valve set comprising at least two corresponding valves is suggested, wherein each valve comprises a gap between the respective valve member and the respective housing, when the respective valve member is in a position maximally restricting the fluid flow, wherein the valves comprise valve members having different diameters, and wherein the second material of each valve member is based on the respective valve diameter and a predefined gap size.

By the same token, a valve set comprising at least two corresponding valves is suggested, wherein each valve comprises a gap between the respective valve member and the respective housing, when the respective valve member is in a position maximally restricting the fluid flow, wherein the valves comprise valve members having the same diameter and have different gap sizes, and wherein the second material of each valve member is based on the respective gap size.

Accordingly, based on the predefined diameter of the valve member or the predefined gap size, the material of the valve member may be chosen, such that the thermal expansion coefficient provides a sufficient tolerance, i.e., a mechanical blockage is avoided, during high temperature differences and variations, which may occur during particular gas engine operations as described in the above. For example, a valve member having a smaller diameter in relation to a second valve member may be formed of a material having a higher thermal expansion coefficient, such that a similar gap size is achieved, when the valve members are heated up during e.g. a startup of the gas engine.

However, it may also be provided that the valve member having the smaller diameter is formed with the same material, or with a material having an even lower thermal expansion coefficient, e.g., when the respective valve is positioned in closer proximity to an area having higher temperatures, such as a combustion area, or when a higher fluid leakage through the valve is considered insignificant or even desired.

Furthermore, a gas engine comprising at least one corresponding valve, as described in the above, is suggested.

The invention claimed is:

1. A valve for a gas engine, comprising
a metal housing having an opening for providing a fluid flow out of the valve, and a metal valve member configured for adjustably restricting the fluid flow through the opening, wherein the housing is made of a first material comprising a steel and wherein the valve member is made of a second material having a thermal expansion coefficient being lower than the first material;
wherein the valve comprises a gap between the valve member and the housing, when the valve member is in a position maximally restricting the fluid flow and wherein the first material and/or the second material is predefined by a gap distance between the valve member and the housing, when:
the gas engine is in a start-up phase or undergoes a load change; and
a temperature of the fluid is between 500° C. to 700° C. and/or a temperature of the valve member is between 410° C. and 560° C.

2. The valve according to claim 1, wherein a ratio of the thermal expansion coefficient between the second material and the first material lies between 0.3 and about 0.6.

3. The valve according to claim 1, wherein the thermal expansion coefficient of the second material lies between $1.0 \times 10^{-6}$/K and $11.0 \times 10^{-6}$/K.

4. The valve according to claim 3, wherein the thermal expansion coefficient of the second material lies between $4.0 \times 10^{-6}$/K and $6.0 \times 10^{-6}$/K.

5. The valve according to claim 1, wherein the second material comprises nickel.

6. The valve according to claim 5, wherein the second material comprises nickel and iron, wherein the percentage by weight of nickel of the second material lies between 25 and 60 and the percentage by weight of iron of the second material lies between 40 and 70.

7. The valve according to claim 1, wherein the valve member is a flap mounted on a shaft and rotatable between a first position enabling a fluid flow through said opening and a second position being received by the opening.

8. A valve set comprising at least two valves according to claim 1, wherein each valve comprises a gap between the respective valve member and the respective housing, when the respective valve member is in the position maximally restricting the fluid flow, wherein the valves comprise valve members having different diameters, and wherein the second material of each valve member is based on the respective valve diameter and the predefined gap size.

9. A valve set comprising at least two valves according to claim 1, wherein each valve comprises a gap between the respective valve member and the respective housing, when the respective valve member is in the position maximally restricting the fluid flow, wherein the valves comprise valve members having the same diameter and have different gap sizes, and wherein the second material of each valve member is based on the respective gap size.

10. A gas engine comprising at least one valve according to claim 1.

* * * * *